United States Patent
Kumashiro

[19]

[11] Patent Number: 5,864,408
[45] Date of Patent: Jan. 26, 1999

[54] READING DEVICE HAVING REFERENCE WHITE SELECTING FUNCTION FOR SHADING CORRECTION

[75] Inventor: Toshiaki Kumashiro, Ebina, Japan

[73] Assignee: Ricoh Company, Ltd., Tokyo, Japan

[21] Appl. No.: 674,879

[22] Filed: Jul. 3, 1996

[30] Foreign Application Priority Data

Jul. 4, 1995 [JP] Japan .................................. 7-168819
Jun. 18, 1996 [JP] Japan .................................. 8-157169

[51] Int. Cl.⁶ .................. H04N 1/40; H04N 1/38; H04N 1/04
[52] U.S. Cl. .................. 358/461; 358/461; 358/464; 358/496; 358/497; 358/498
[58] Field of Search .................... 358/461, 464, 358/496, 497, 498

[56] References Cited

U.S. PATENT DOCUMENTS 4,907,097  3/1990  Sobue ................................... 358/461

FOREIGN PATENT DOCUMENTS 2-134068  5/1990  Japan .
2-149068  6/1990  Japan .
4-040058  2/1992  Japan .

*Primary Examiner*—Edward L. Coles
*Assistant Examiner*—Twyler M. Lamb
*Attorney, Agent, or Firm*—Oblon, Spivak, McClelland, Maier & Neustadt, P.C.

[57] ABSTRACT

A reading device, having both modes of a book scanner and a sheet scanner, to be used in a handling apparatus having a function for selecting a reference white plate. The reading device includes a reading unit, a first reference white plate, which is mounted within an area where an original document is transferred and where therefore dust may be carried and raised thereabouts. The first reference white plate is usually read by the reading unit in the sheet scanner mode. A second reference white plate is mounted out of an area of a transference of an original document, and therefore no dust is carried or raised thereabouts. The reading device further includes a controller which controls the reading unit to suitably select reading a white density from between the first reference white plate and the second reference white plate in accordance with a shading correction situation so as to improve an image output quality.

22 Claims, 17 Drawing Sheets

(INDICATING OUTPUTS WITH INCREASING BACKGROUND DIRTINESS)

READING DEVICE HAVING REFERENCE WHITE SELECTING FUNCTION FOR SHADING CORRECTION

BACKGROUND OF THE INVENTION

1. Field of the Invention

This invention relates to a reading device to be used in a handling apparatus such as a facsimile, a copying apparatus, and so forth, as examples, and more particularly to a reading device having a function for selecting a reference white plate to make shading correction data suitable to a reading condition so as to avoid an uneven image output quality.

2. Discussion of the Background

A reading device for reading an original document has been used in several kinds of handling apparatus, such as, a facsimile machine, a copying machine, a scanner, and so forth, as examples. One type of reading system for a reading device is commonly referred to as a book scanning system in which an original document to be read, which original document may be in cut-sheet form and a book, is stationed on a supporting table. The original document is read by a reading unit which is movably supported by a frame underneath the supporting table in the reading device. This operation may be referred to as a moving reading mode. Another type of reading system, which may be referred to as a stationary reading mode, for a reading device is also commonly referred to as a sheet through scanning system in which only an original document in a sheet form is accepted, and such an original document is transferred so as to pass through a reading unit which is fixed underneath the supporting table in the reading device to read the sheets of such a fed original document. These two types of reading systems have different advantages. For example, the book scanning system has superiority in the range of reading subjects, from a sheet of a paper of various sizes and thickness to a book, a reading accuracy, and so forth, and, for example, the sheet through scanning system has superiority in a compactness, an inexpensiveness, and so forth. A reading device has been also introduced that implements both the book scanning system and the sheet through scanning system.

Generally, the above-mentioned reading device has an electrical correction process of a signal, a so called shading correction, to be applied when an image signal is generated by reading an original document. The shading correction corrects for an uneven white level of an image signal representing image information from the original document.

For this purpose of the shading correction, a reference white plate is provided in the reading device to provide a reference white level relative to a white level in the above-mentioned image signal. Such a reference white plate is scanned by the reading device before a start of reading information of an original document, and a reference white density is read as a result. FIGS. 11(a) and 11(b) are illustrations of signal waveforms in a full scanning line explaining an idea of the shading correction, and representing a reading of a reference white plate and a corrected waveform by the shading correction respectively. As shown in FIG. 11(a), V(p) of a peak value of a white density level in a reference white plate reading signal in a full scanning line is read in and is used as a reference value V(r) to correct a white density level in the reference white plate reading signal in a full scanning line as shown in FIG. 11(b).

A reading of a reference white plate is essential to ensure that an image signal is corrected by a superior shading correction with such a reference white plate. Various proposals related to this field have been introduced, accordingly. Some of these proposals, such as, for example, a shading distortion correction and a correction based on a reference brightness signal, are disclosed in the official gazette for Laid Patent Applications TOKUKAI HEI 2-134068, TOKUKAI HEI 2-149068.

However, such a shading correction system utilizing a single reference white plate suffers from drawbacks. More particularly, as a result of the number of original documents passing near the reference white plate in the sheet through scanning system, a scanning path to and a reading surface of the reference white plate may become dirty with dust after long use.

FIGS. 12(a) and 12(b) are illustrations of signal waveforms respectively representing an abnormal reading of a reference white plate which is dirty with dust and a correction result of the abnormal reading. As shown in FIG. 12(a), when a scanning path to or a reading surface of a reference white plate becomes dirty with dust, an output level of a reading of the reference white plate is correspondingly reduced at those dirty points as indicated by points A in FIG. 12(a). In this case, if a shading correction is performed on the signal of the above-mentioned abnormal reading of the reference white plate, and a reading of an original document is proceeded based on such a reference white level with an abnormal signal, the above-mentioned reduced output level indicated by points A in FIG. 12(a) correspondingly appears as peak values above a reference level in an output of reading the original document as indicated by spikes B in FIG. 12(b). This kind of an abnormal shading correction causes an abnormal image output, such as, for example, a vertical black line, a darkened image, or the like.

A degree of the above-mentioned dirtiness with dust around a scanning path to and a reading surface of a reference white plate is related to a size of a space between the reference white plate and an original document reading device thereof. Such a space may be made relatively small when an original document reading device having a high reading resolution or another original document reading device having a low illumination depth, such as a contact image sensor, is applied, although this does not totally overcome such problems, and may add expense.

As another background art, an image reading apparatus 2 as disclosed in Japanese Laid Open Patent Application 2-135068 as shown in FIG. 13 is now discussed. Such an image reading apparatus 2 includes an automatic document feeder 3, a control unit 21, a charge couple device (CCD) 22, a driver 23 for the CCD 22, a light source 24, a reflector 25, a lens 26, a glass platen 27, a reference position indicator for a book scanning operation 28, an original document holder 31, an exit path 32 and a reference position indicator for a sheet scanning operation 33. In this device as shown in FIG. 13, a reference white plate (not shown) can be utilized at a place where such a reference white plate can be read.

FIGS. 4(a)–4(c) are illustrations which explain characteristics of a light source, such as light source 24 of FIG. 13, in which a light amount is reduced over time, and which thereby similarly reduces an output level of read images and on corresponding copies if uncompensated. That is, as shown in FIG. 4(a), with a light source, such as light source 24 of FIG. 13, the amount of light decreases with the number of copies made, which thereby results in a corresponding reduction in an output level of the CCD 22, see FIG. 4(b). As a result, the corresponding sheets have an increased amount of background dirt, i.e., the sheets become less white, see FIG. 4(c).

In the device shown in FIG. 13, a reference white plate is read a plural number of times with changing a reading line thereon, before a start of reading an original document. A light amount at each picture element in a read line is then compared with detected light amounts of picture elements in other lines, and a picture element which has a maximum light amount among the compared lines is selected to be a part of the reference white data. Reference white data that covers a full scanning width of an original document is then constituted by the data of the selected picture elements, and is then used for a shading distortion correction. One object of such an arrangement is to reduce an opportunity of a data distortion caused by factors such as, for example, dust which adheres to or scratches a surface of the reference white plate, or an uneven light amount generated by light source 24.

However, such a device as disclosed in FIG. 13 suffers from significant drawbacks. In such a device, since only a single reference white plate is provided to be mainly used for the sheet scanning mode, and may be located at a position where the reference white plate is exposed to dust, a distortion on data is unavoidable if a distortion factor such as, for example, dust adhered to or a scratch formed on the surface of the reference white plate, or an unevenly generated light amount, is larger than the area across the plural lines being read by the image scanner. Or, when such a single reference white plate is provided to be mainly used for the book scanning mode, the single reference white plate may be positioned at another position where the single reference white plate is maintained at a relative difference from the reading position in the sheet scanning mode. In this case, when a plural number of original document sheets are read in the sheet scanning mode, to read the reference white plate before a start of reading each sheet is not practical, and therefore the reading of the first sheet is usually the reference white data for all subsequent sheets of the original document to be read. As a result, an output image density of the background becomes darkened from page to page, as shown in FIG. 4, because a relationship between the content reference white value and a reduction of the light amount over time reduces an output level from the CCD 22.

As shown in FIG. 4, and as described above, a first copy sheet is output with a clean background but a sixth copy sheet is output with a dirty background if the reference white data stored during the first sheet reading operation is used as the reference data. In a text image reading mode comparable to a halftone image reading mode, the text image is processed to binary data without referring to the reference white, and therefore an output image is less influenced by a reduction of an output level over time.

SUMMARY OF THE INVENTION

Accordingly, one object of the present invention is to provide a novel reading device which can properly perform a shading correction with avoiding an abnormal effect to an image output quality caused by dust.

A further object of the present invention is to achieve a beneficial shading correction, while minimizing a time necessary for reading a multiple sheet original document.

A further object of the present invention is to perform a beneficial shading operation, while compensating for differences in distances between a reading device and first and second reference white plates or differences in thickness of contact glass elements.

A further object of the present invention is to provide a beneficial shading correction, while compensating for changes in an output light of a light source in a reading operation.

The present invention achieves these and other objects by forming an image reading device which can read documents in both a stationary sheet through feeding operation and a moving book scanning operation. The present invention utilizes first and second reference white plates. The second reference white plate is located at a position outside of a paper feed path, and is thus protected from dust and is utilized in a book scanning operation. However, in the present invention the second reference white plate is also initially referenced in the stationary sheet through scanning operation.

As a further operation of the present invention, to quicken the amount of time to perform a reading of a multiple sheet original document, the second reference white plate can be initially referenced in a stationary sheet through scanning mode for a first sheet for the multiple sheet original document, and then the first reference white plate can be referenced for succeeding sheets of the multiple sheet original document.

As a further feature of the present invention, the second reference white plate can be initially referenced, and then will only be referenced after a certain predetermined time or subsequent number of sheets of an original document have been read.

As a further feature of the present invention, the second reference white plate can be read prior to each reading of a sheet of a multiple sheet original document.

As a further feature of the present invention, changes in an output light of a light source when a multiple sheet original document is being read can also be compensated for.

As a further feature of the present invention, a correction factor can be calculated for a difference in distances between a reading device to the first and second reference white plates or a difference in thickness of contact glass elements.

Other objects, features, and advantages of the present invention will become apparent from the following detailed description when read in conjunction with the accompanying drawings.

BRIEF DESCRIPTION OF THE DRAWINGS

A more complete appreciation of the present invention and many of the attendant advantages thereof will be readily obtained as the same becomes better understood by reference to the following detailed when considered in connection with the accompanying drawings, wherein.

DESCRIPTION OF THE PREFERRED EMBODIMENTS

Figure 1:
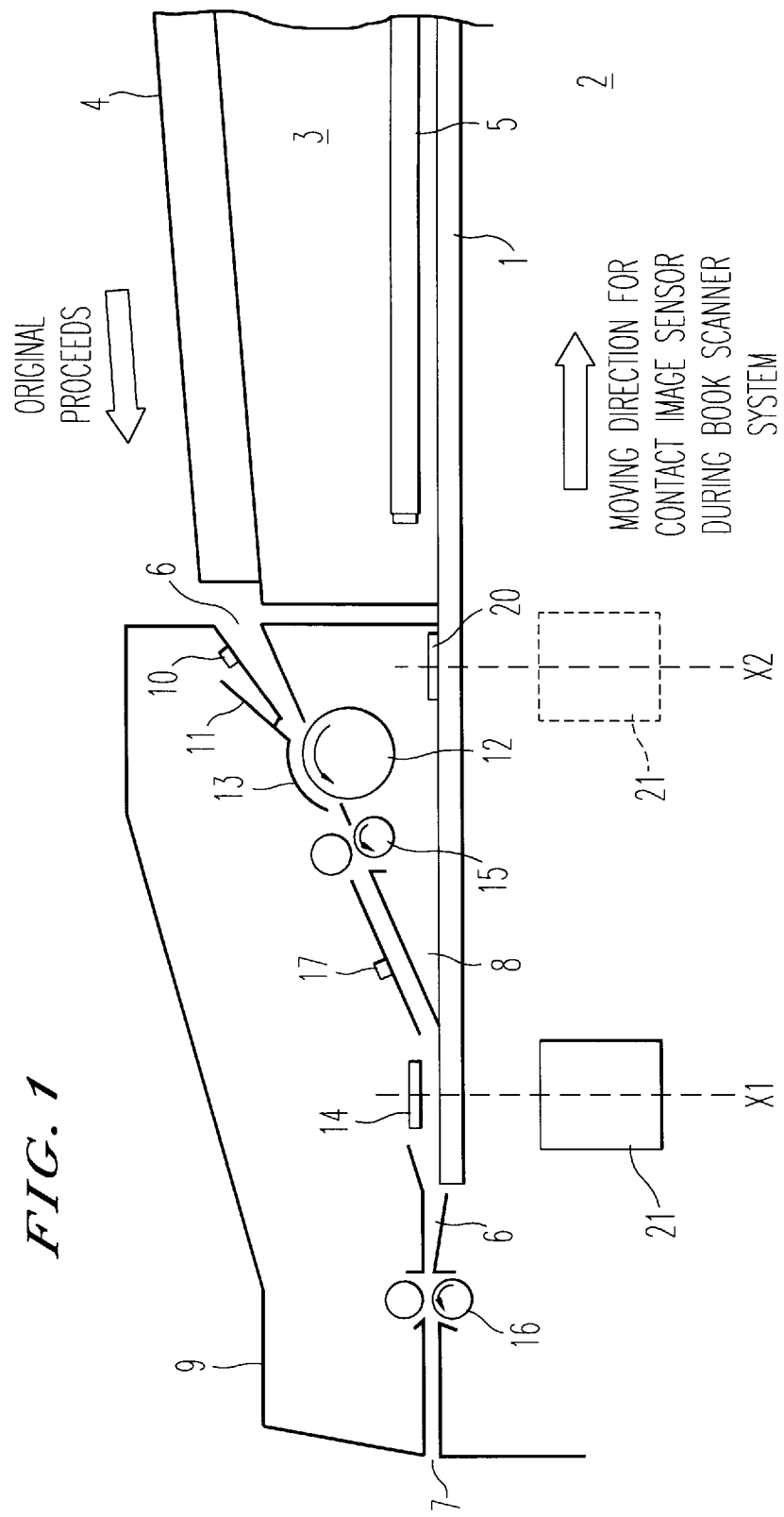
FIG. 1 is an illustration showing a structure of an image reading portion of a reading device embodying the present invention.

In describing preferred embodiments of the present invention illustrated in the drawings, specific terminology is employed for the sake of clarity. However, the present invention is not intended to be limited to the specific terminology so selected and it is to be understood that each specific element includes all technical equivalents which operate in a similar manner.

Referring now to the drawings, wherein like reference numerals designate identical or corresponding parts throughout the several views, and more particularly to FIG. 1 thereof, there is illustrated a part of a reading apparatus showing an exemplary embodiment of the present invention. The present invention can also clearly be implemented in other reading devices.

As shown in FIG. 1, a contact glass 1 is mounted on an upper part of the reading, e.g. facsimile, apparatus 2. Above the contact glass 1, a platen plate 3 is movably supported by the reading apparatus 2 so that an opening is made around an upper surface of the contact glass 1 when the platen plate 3 swings upwards and backwards. A bed 4 is mounted on the top of the platen plate 3 for placing an original document thereon. A pressure plate 5 is mounted on the bottom of the platen plate 3 for pressing an original document to the upper surface of the contact glass 1. A paper path 6 is made for guiding an original document from the bed 4, which can supply original documents continuously, through the left edge of the contact glass 1 in FIG. 1 to an exit 7 in the left of FIG. 1. A lower guide plate 8 and an upper guide plate 9 are used for forming the paper path 6.

Along the paper path 6, there are mounted various components, such as, a first paper sensor 10, a sheet separator 13, a first reference white plate 14, first transfer rollers 15, second transfer rollers 16, and a second paper sensor 17. The first sensor 10 is used as an original document sensor for detecting a placement of an original document on the bed 4, and also as a size sensor for detecting a size of the original document. An original document separator 13 includes separations pad 11 and feed roller 12 and transfers an original document, sheet by sheet, with separating a sheet from multiple sheets placed on the bed 4.

The first reference white plate 14 is mounted at a reading position X1, which is located at an edge portion of the contact glass 1. The reading position X1 is used when a stationary reading mode, e.g. a sheet through scanning system or an automatic document feeder (ADF) is selected, wherein the scanning is operated with transferring an original document by the first transfer rollers 15 and the second transfer rollers 16. The first transfer rollers 15 and the second transfer rollers 16 are respectively formed of pairs of rollers, and are respectively located in front of and at the back of the reading position X1. The second sensor 17 is located between the first transfer rollers 15 and the reading position X1, and detects the leading edge and the trailing edge of an original document being transferred.

A second reference white plate 20 is mounted at a reading position X2 and is located near a left side of the pressure plate 3 as shown in FIG. 1 so as to be in contact with the surface of the contact glass 1. The reading position X2 is used when a moving reading mode, e.g. a book scanning system, is selected. Underneath the contact glass 1, a moving device, which is not shown in the drawings, is held for movement relative to the contact glass 1 back and forth in the right and left direction in FIG. 1. The moving device carries a contact image sensor 21 thereon which reads the original document, the first reference white plate 14 and the second reference white plate 20.

Figure 2:
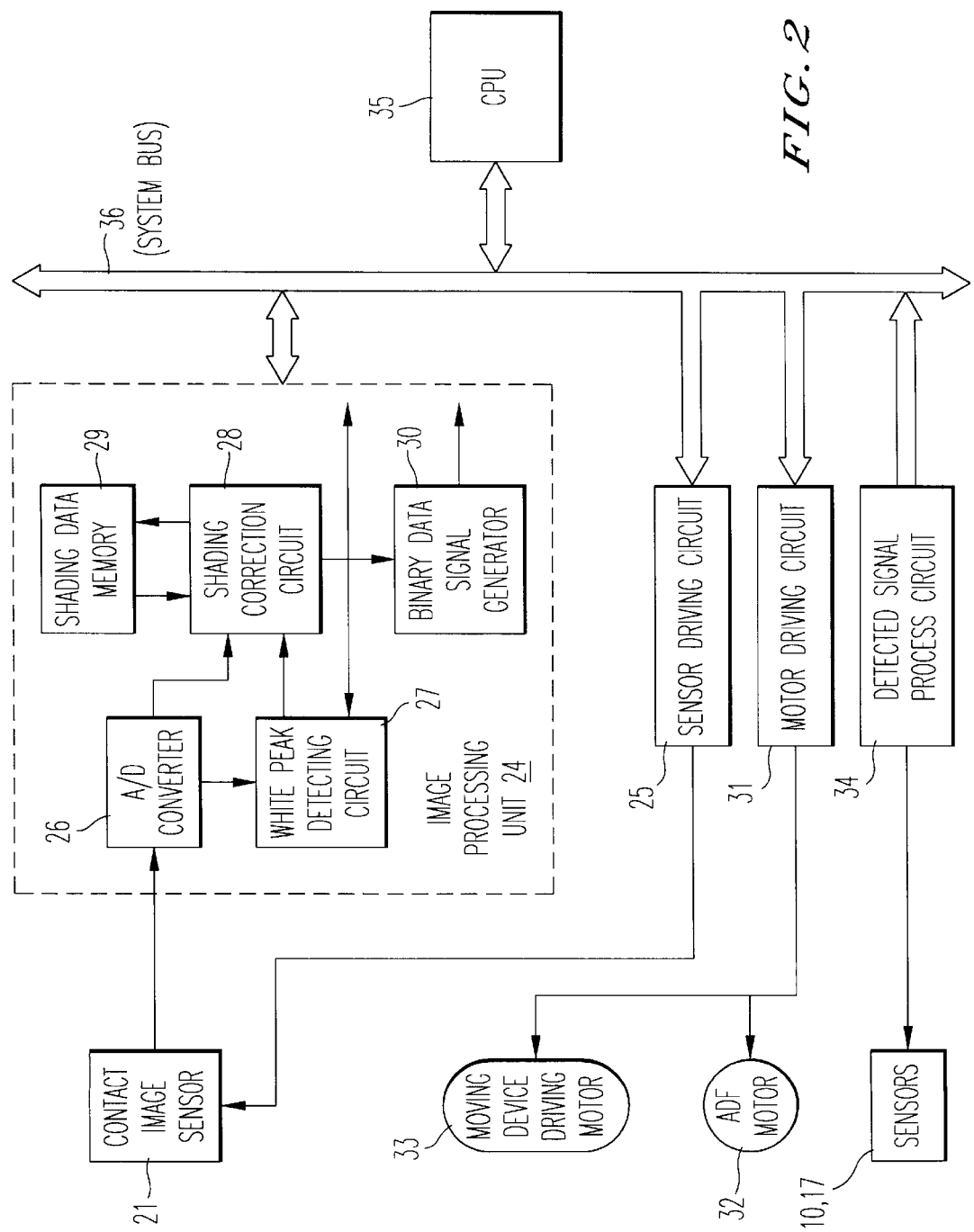
FIG. 2 is a block diagram illustrating a CPU and its major controlling elements shown in FIG. 1.

Next, a controlling system for the structure of the reading apparatus in FIG. 1 is explained with respect to a block diagram shown in FIG. 2.

An image processing unit 24 includes an analog to digital (A/D) converter 26, a white peak detecting circuit 27, a shading correction circuit 28, a shading data memory 29, and a binary data signal generator 30. The A/D converter 26 converts an analog signal output by the contact image sensor 21 to a digital signal. The white peak detecting circuit 27 detects a peak value in the output signal from the A/D converter 26, when either the first reference white plate 14 or the second reference white plate 20 is read. The shading correction circuit 28 is used for calculating shading correction data based on the above-mentioned peak value detected by the white peak detecting circuit 27 and for performing a shading correction on the output signal from the A/D converter 26 by using the shading correction data stored in the shading data memory 29; the shading device data memory 29 receives such shading correction data from the shading correction circuit 28. The binary data signal generator 30 generates a binary data signal through various data processings on an image signal produced by the contact image sensor 21, when an original document is read.

The following components are also shown in FIG. 2. A sensor driving circuit 25 is used for driving the contact image sensor 21. A motor driving circuit 31 is used for driving an ADF (automatic document feeder) driving motor 32 so as to drive the first transfer rollers 15 and the second transfer rollers 16. A moving device driving motor 33 is used for driving the moving device which carries the contact image sensor 21 thereon. A detected signal process circuit 34 is used for processing the signals from the first sensor 10 and the second sensor 17. A CPU (central processing unit) 35 monitors output signals from each circuit via a system bus 36 and controls the entire system by applying various control signals to each circuit via a system bus 36.

Figure 3A:
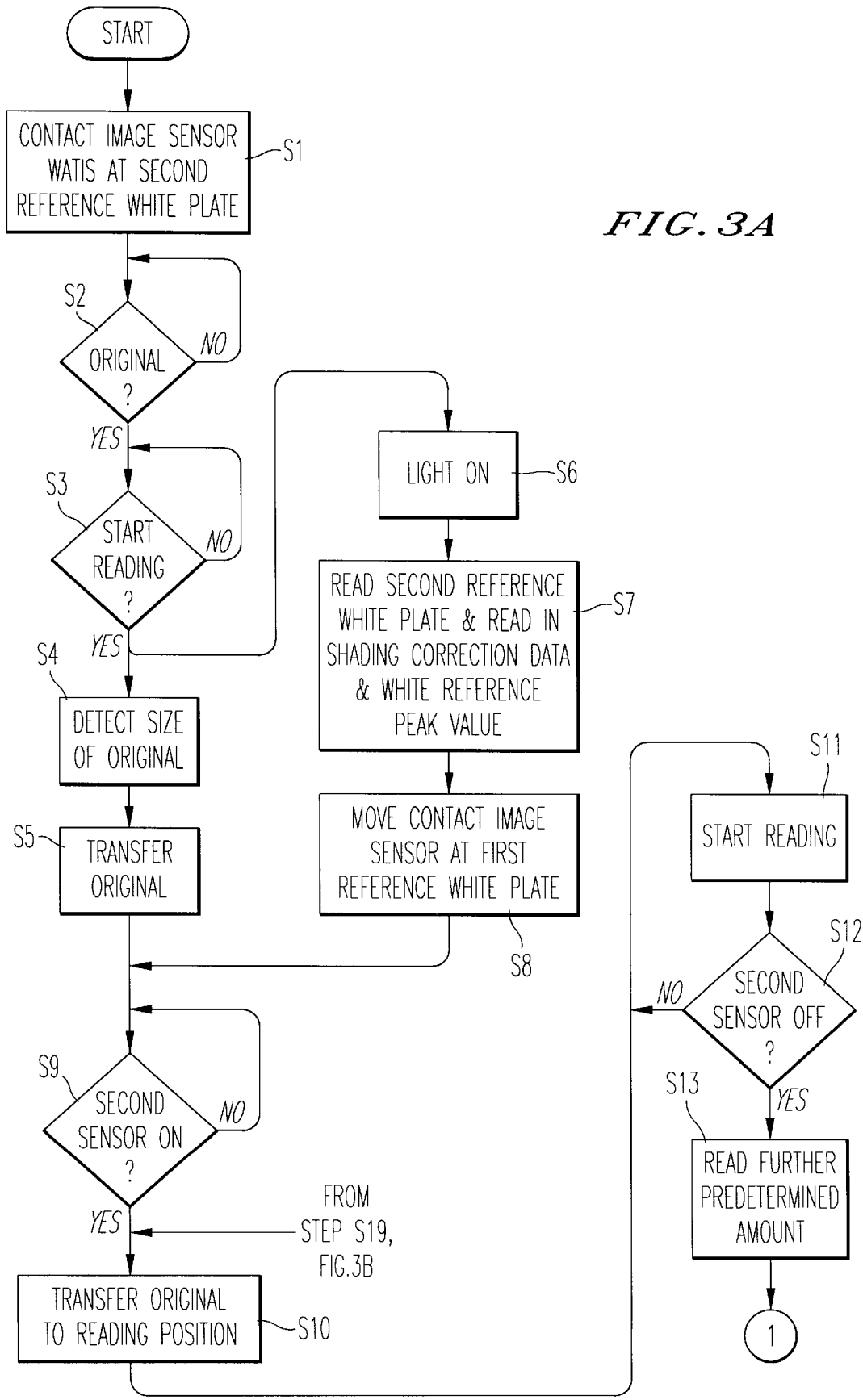
FIG. 3 is a flowchart explaining an outline of a basic reading operation of the reading device shown in FIG. 1.
Figure 3B:
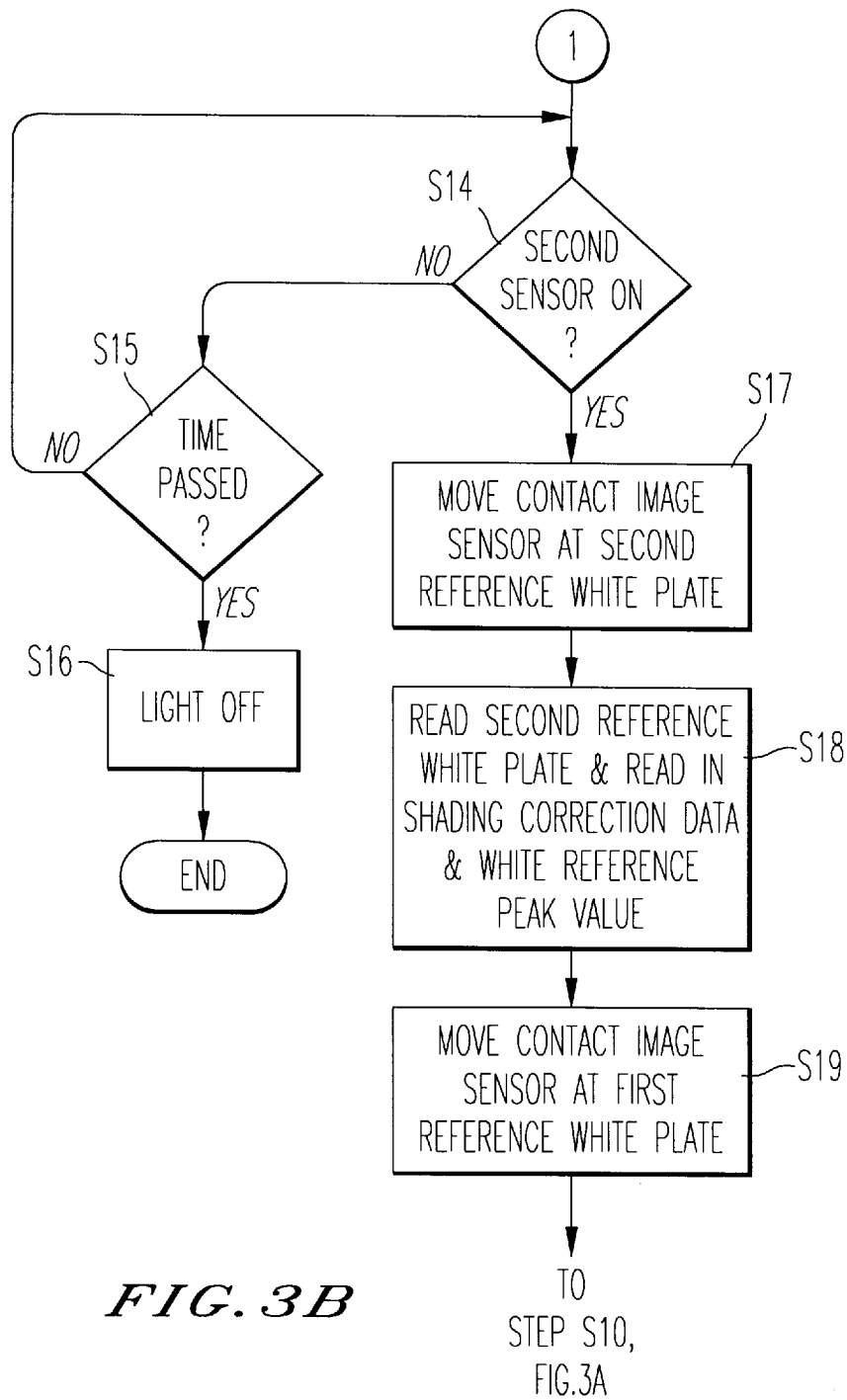

Next, a scanning operation by the reading apparatus having the above-mentioned structure according to the present invention is explained with respect to the flowchart shown in FIG. 3. The CPU 35 instructs, in Step S1, the motor driving circuit 31 to move the moving device so as to set the contact image sensor 21 on standby at the reading position X2 of the second reference white plate 20 (see the position of the dotted contact image sensor 21 in FIG. 1) in both cases of operating in a stationary reading mode, e.g., a sheet through scanning system, and a moving reading mode, e.g., a book scanning system.

In the stationary sheet through scanning system, when a placement of an original document on the bed 4 is detected by the first sensor 10, YES in Step S2, and a depression of a start key for starting scanning of the original document for, as examples, facsimile transmission or copying, is detected, YES in Step S3, the CPU 35 instructs, in Step S4, the first sensor 10 to read the size of the original document. Then, in Step S5, the motor driving circuit 31 drives the feed roller 12 of the sheet separator 13, the first transfer rollers 15, and the second transfer rollers 16 so as to transfer the original document, sheet by sheet, by separating one sheet from a multiple sheet original document placed on the bed 4.

In parallel to Steps S4 and S5, the CPU 35 further executes Steps S6, S7, and S8. The CPU instructs, in Step S6, the sensor driving circuit 25 to turn on the light source in Step S7 and to drive the contact image sensor 21 to read the second reference white plate 20. The CPU 35 further instructs, also in Step S7 after Step S6, the image processing unit 24 to read in a peak value in the signal from the contact image sensor 21 reading second reference white plate 20 and data for the shading correction from the shading data memory 29. The CPU further instructs, in Step S8 after Step S7, the motor driving circuit 31 to move the contact image sensor 21 to the reading position X1 under the first reference white plate 14.

When the leading edge of the original document being transferred in Step S5 passes the second sensor 17, which is therefore turned on, i.e., second sensor 17 turns on when the leading edge of the original document is detected, YES in Step S9, the CPU 35 instructs the motor driving circuit 31 to move the original document further forward until the leading edge of the original document comes to the scanning line of the reading position X1 in Step S10. Then, in Step S11, the CPU 35 instructs the sensor driving circuit 25 to control the contact image sensor 21 to start reading an image of the original document and the motor driving circuit 31 to continue to transfer the original document in synchronism with the reading operation.

At this time, the image signal output from the contact image sensor 21 is sent to the image processing unit 24, and therein receives a shading correction by the shading correction circuit 28 using the shading correction data when the image signal is a black and white image original. Additional signal processings can also be performed at this time, such as, for example, an image processing based on the above-mentioned peak value in the reading of the second reference white plate 20, and so forth, when the image signal is a halftone image original, and a further signal processing for generating a binary data signal by the binary data signal generator 30 can be performed.

Further, when the trailing edge of the original document passes the second sensor 17, and which is therefore turned off, YES in Step 12, the CPU 35 instructs the sensor driving circuit 25 to further read the original document for a predetermined length in the remaining part of the original document, and the CPU 35 instructs the motor driving circuit 31 to continue to transfer the original document in synchronism with the reading operation in Step S13.

As described above, the second reference white plate 20, which because of its positioning would normally be used in the moving book scanning mode and which is kept relatively free from dust and the like as it is located in the covered area as shown in FIG. 1, is also used in the stationary sheet through scanning mode, and therefore, the shading correction is performed in a superior manner without adding any extra member as a reference white plate. That is, in the present invention, even in a stationary sheet through scanning mode the second white plate 20, which is normally used only in the book scanning mode, is utilized to obtain reference white data. Since this second reference white plate 20 is positioned where it is relatively free from dust, this provides excellent reference white data in such an operation of the present invention.

If it is not preferred to use the second reference white plate 20 for the stationary sheet through scanning mode, for example, in a case that the second reference white plate 20 is exclusively used by the moving book scanning mode, an extra reference white plate can be provided and located at a position other than around the paper path 6, in order to be kept free from the dust, and this extra reference white plate can be used alternatively as a reference white plate in the stationary sheet through scanning mode.

Figure 4A:
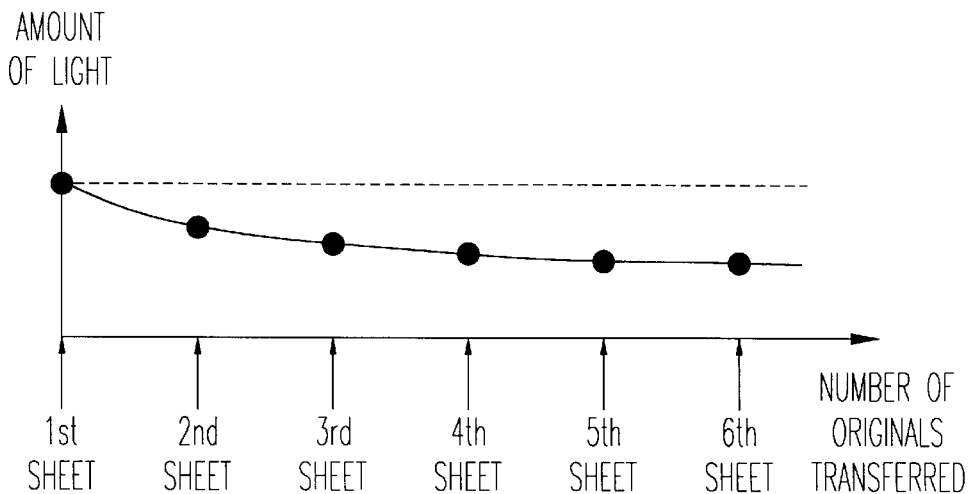
FIGS. 4(a)–4(c) are illustrations of an output signal waveform from a contact image sensor with a light source turned continuously on for explaining a signal level reduction over time.
Figure 4B:
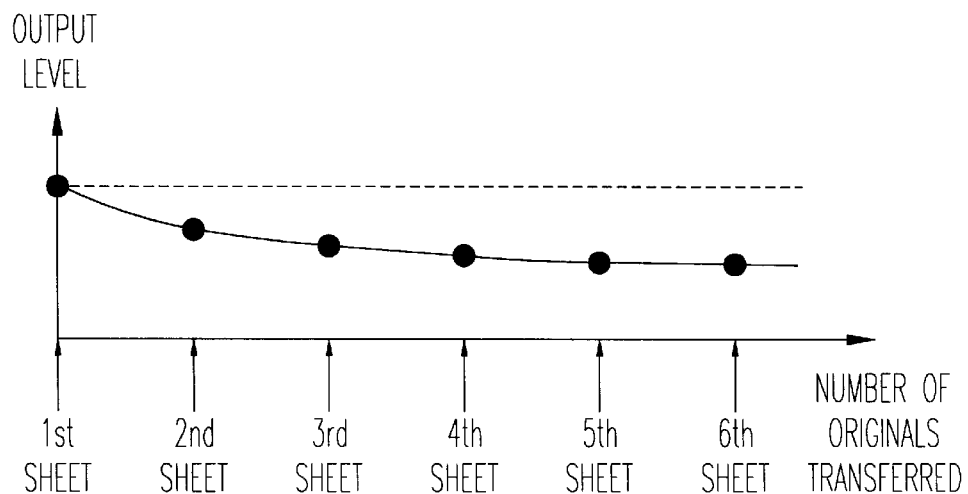
Figure 4C:
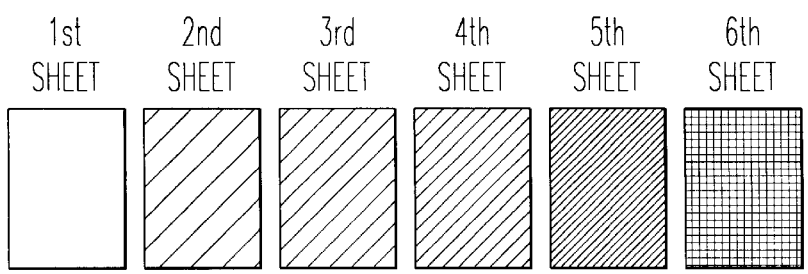

Next, and as noted earlier, the amount of the source light, which may vary with time, of the contact image sensor 21 is explained with respect to FIGS. 4(a)–4(c). When multiple sheets or an original document are consecutively read, the source light of the contact image sensor 21 is kept continuously turned on and its light amount tends to decrease over time, as shown in FIG. 4(a). As shown in FIG. 4(b), as a result an output power level of the signal from the contact sensor 21 continuously declines relative to the output light level at the time of the reading of the second reference white plate 20 at the beginning of the reading. Since the peak value in the image signal, representing the reading of the second reference white plate 20, is referenced by the CPU 35 to correct the image signal when images are read, output images become relatively darkened over time when multiple sheet original documents are read by referring to the first reading of the second reference white plate 20, see FIG. 4(c).

To avoid the above-mentioned problem, as a further feature of the present invention, a novel operation of reading second and succeeding sheets of a multiple sheet original document is set forth.

As shown in FIG. 3, the CPU 35 detects whether a succeeding sheet of the multiple sheet original document is being transferred or not by detecting a leading edge of such succeeding sheets of the multiple sheet original document with the second sensor 17 which is turned on, Step S14, when each succeeding sheet is detected. When such a detection is not made for a predetermined time period, YES in Step S15, the CPU 35 judges that there is no succeeding sheets of the original document and instructs the sensor driving circuit 25 to turn the source light off in Step S16 to end the system operation.

When succeeding sheets of an original document are being transferred, each leading edge of each succeeding sheet of the original document is consecutively detected by the second sensor 17 which is turned on at each detection, YES in Step S14. Upon each detection of the leading edge of the sheets of the original document, the CPU 35 instructs the motor driving circuit 31 to move the contact image sensor 21 to the position of the second reference white plate 20 in Step S17, and further instructs, in Step S18, the sensor driving circuit 25 to read the second reference white plate 20, so as to read in the shading correction data and a peak value in a reading of the second reference white plate 20, which is used as a reference white value when images of the succeeding sheets of the original document are read. After a completion of such data reading in, the CPU 35 further instructs the motor driving circuit 31 to move the contact image sensor 21 again to the reading position X1 under the position of the first reference white plate 14 so as to start a reading in the stationary sheet through scanning mode in Step S19. After that, the CPU proceeds the operation to Step S10 in FIG. 3, and therein, consecutively executes reading sheets of the original document as described above, and also in a manner as illustrated in FIGS. 5(a) and 5(b).

Figure 5A:
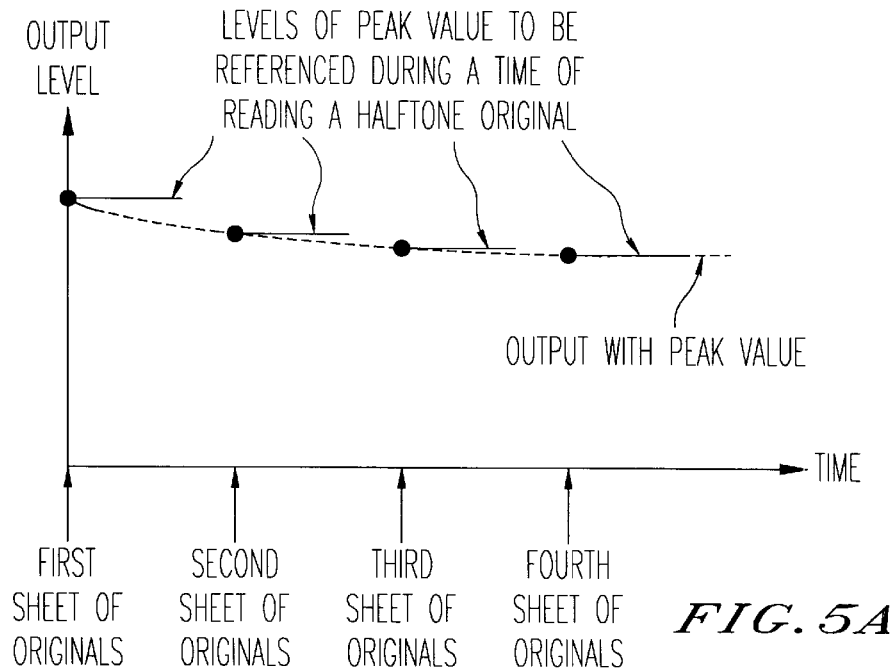
FIGS. 5(a)–5(c) are illustrations explaining examples of a reference white plate reading timing.
Figure 5B:
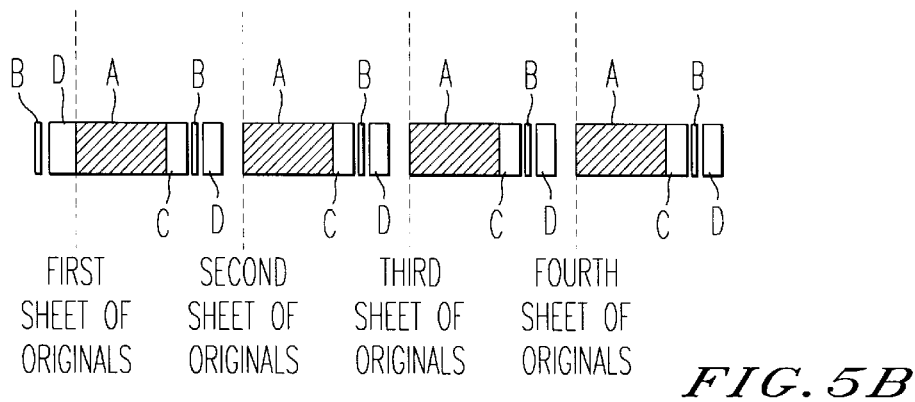

That is, as shown in FIGS. 5(a) and 5(b), in one operation of the present invention the second reference white plate 20 can be read prior to reading each sheet of an original document.

In FIG. 5(b) the letter or Step A indicates a time for reading an original document, letter or Step B indicates a peak value reading in time of the second reference white plate 20, letter or Step C represents a moving time of the contact image sensor 21 to position X2 under the second reference white plate 20, and letter or Step D indicates a moving time of the contact image sensor 21 to the standby position X1 under the first reference white plate 14. In this way, as shown in FIGS. 5(a) and 5(b), prior to each reading time A of an original document, a peak value of reading the second reference white plate 20 is detected, see Step B, and the contact image sensor 21 is moved to the reading position X1 of the first reference white plate 14, see Step D. Further, after the original document is read, see Step A, the contact image sensor 21 must be moved to the reading position X2 of the second reference white plate 20, see Step C. This operation in the present invention has the advantage of always having accurate white level reference data since the second reference white plate 20 is read prior to each reading of a sheet of the original document.

Figure 5C:
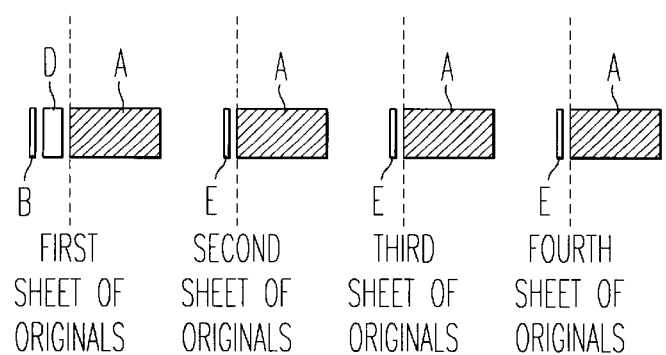
Figure 6A:
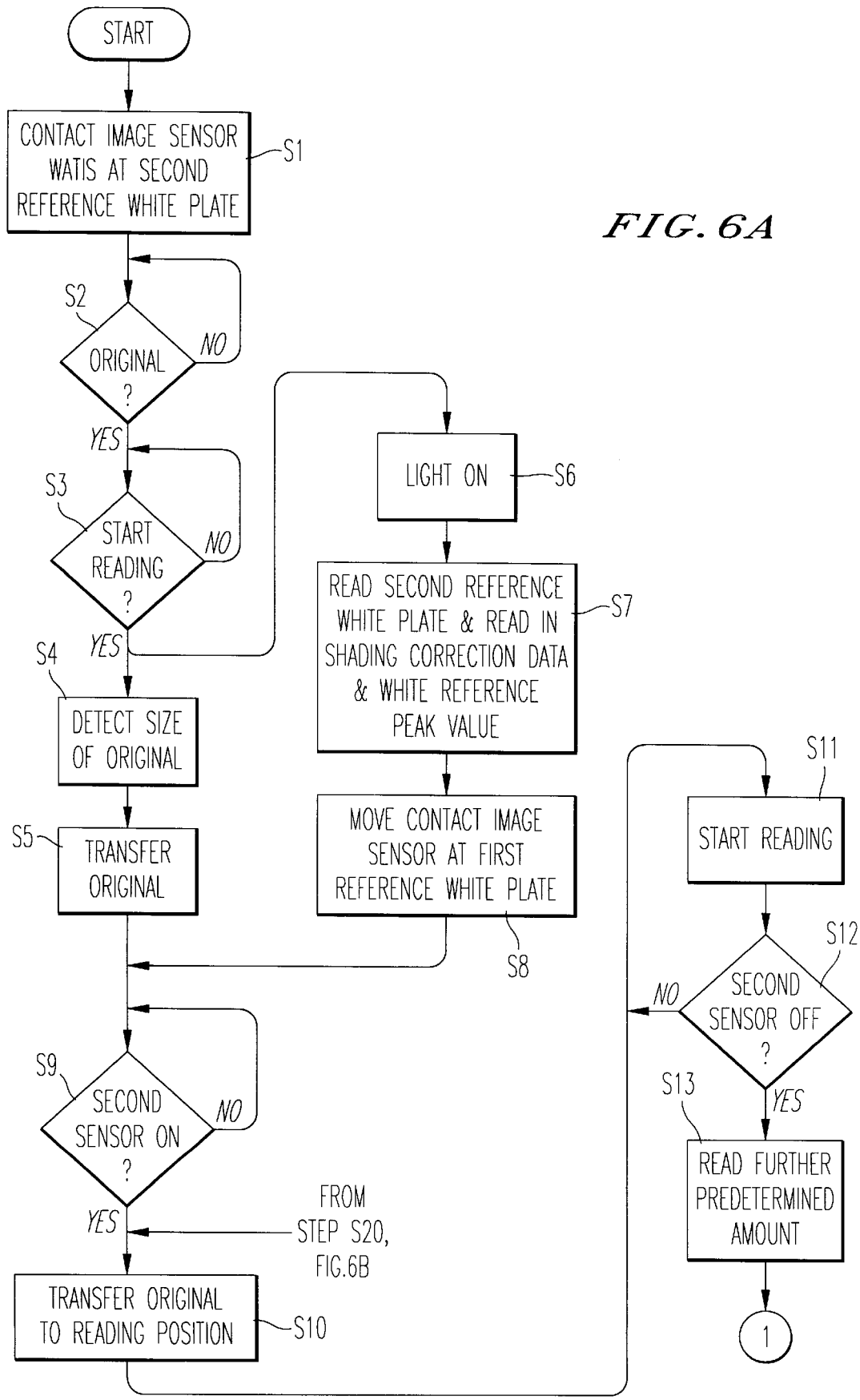
FIG. 6 is a flowchart explaining an outline of a reading process of a second subsequent original document in a consecutive reading mode.
Figure 6B:
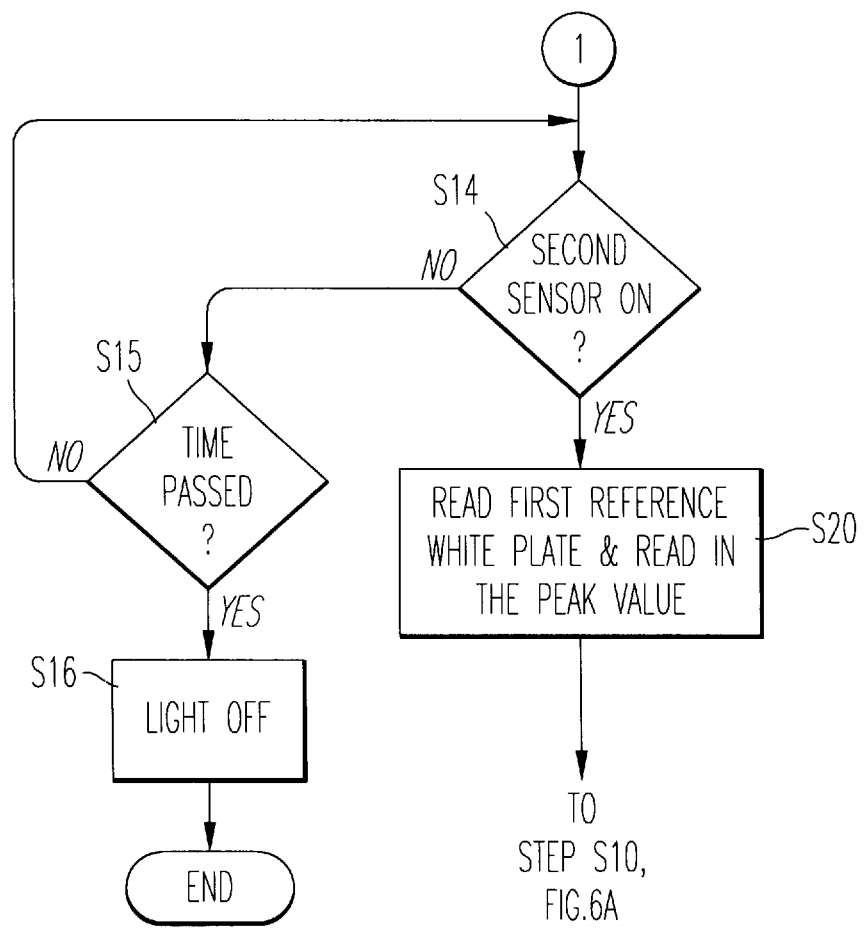

However, repeating a movement of the contact image sensor 21 back and forth between positions to read the first reference plate 14 and the second reference plate 20 as described above increases a time of an operation per sheet of an original document in proportion to the distance between the first reference plate 14 and the second reference plate 20. To shorten the operation time per sheet of an original document, a further novel operation of reading a second and succeeding sheets of an original document is arranged in the following manner, as shown in FIGS. 5(c) and 6. It is noted that in FIG. 5(c) the letter or Step E indicates a time for reading in a peak value of the first reference white plate 14.

With reference to FIGS. 5(c) and 6, in a further operation of the present invention, when reading a second sheet of an original document, or one of the succeeding sheets of the original document, the CPU 35 controls, in Step S20, the motor driving circuit 31 to move the contact image sensor 21 to read the first reference white plate 14, so as to read in a peak value detected by reading the first reference white plate 14 to use as a reference white level. In this case, the CPU 35 does not implement the shading correction data operations of Steps S17–S19. In this way, the operation of FIG. 6 is identical to the operation in FIG. 3 except that Steps S17–S19 in FIG. 3 are replaced by Step S20.

That is, in this further operation of the present invention as shown in FIGS. 5(c) and 6, after a reading time A of each original document, only the first reference white plate 14 is utilized to read in reference white data, see Step E in FIG. 5(c). This operation of the present invention can clearly shorten the processing time, but does not provide for the shading correction data to be based on reading the second reference white plate 20 for second and subsequent sheets of a multiple sheet original document.

As shown in FIG. 1, a height of the first reference white plate 14 differs from that of the second reference white plate 20. This results because the first reference white plate 14 must be raised so sheets of the original document can pass underneath the first reference white plate 14. This may give rise to further drawbacks in such a device as FIG. 1.

Figure 7A:
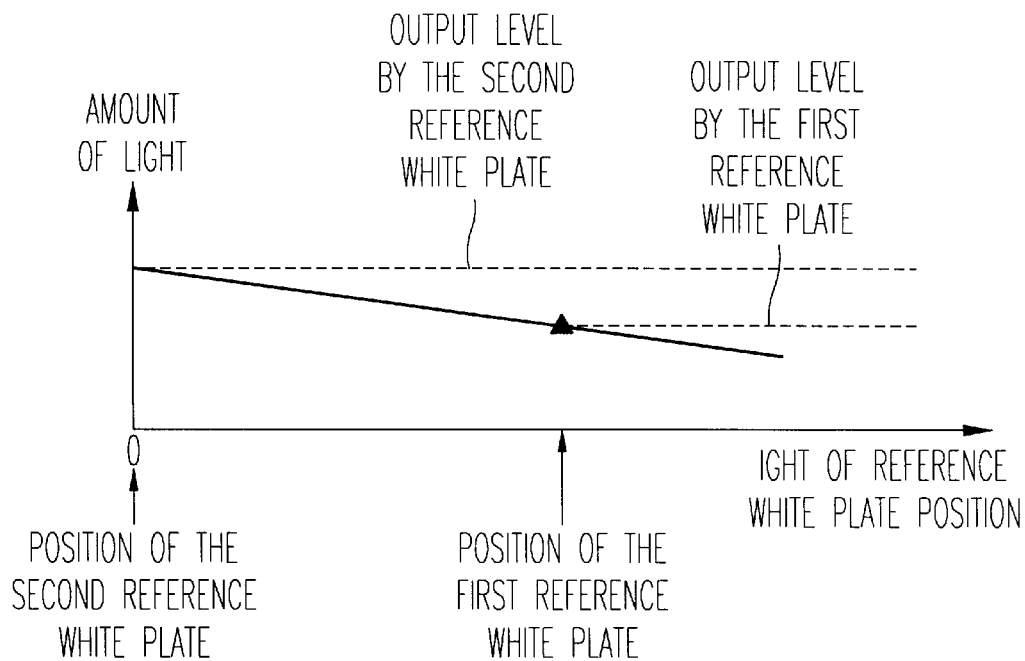
FIGS. 7(a) and 7(b) are illustrations showing a difference in an output level by readings of two reference white plates.

That is, when the multiple sheets of an original document are read, the contact image sensor 21 detects a reference white level differently between a reading of the first reference white plate 14 and a reading of the second reference white plate 20, and therefore, generates two output signals with a large difference in a power level, as shown in FIG. 7(a). As noted above, this is caused by a difference in positioning, particularly in a vertical direction, of the first 14 and second 20 reference white plates. The first reference white plate 14 may be at a relatively greater distance from the contact image sensor 21 than the second reference white plate 20 since copy sheets pass underneath the first reference white plate 14. The output level of reading the second reference white plate 20 may therefore be greater than the output level of reading the first reference white plate 14 since the second reference white plate 20 is closer to the contact image sensor 21.

In this way, light dispersion on the surface of the reference white plates 14, 20 becomes different in the two cases of reading the first reference white plate 14 and the second reference white plate 20. Therefore, if a peak value in a reading of the reference white plates detected for the image reading is applied as it is, an output image in the stationary sheet through scanning mode may become less dark than an output image in the moving book scanning mode since the output level of a signal by reading the first reference white plate 14 through a contact glass at the reading position X1 becomes relatively high.

Further, in a case two contact glasses which have different thicknesses are used in the stationary sheet through scanning system and in the moving book scanning system, an output level of a peak value in a reading of the first 14 and second 20 reference white plates may also become different at a surface of the contact glass between those two contact glasses, and therefore, a reading density of the image in the stationary sheet through scanning mode may differ from that in the moving book scanning mode.

Figure 7B:
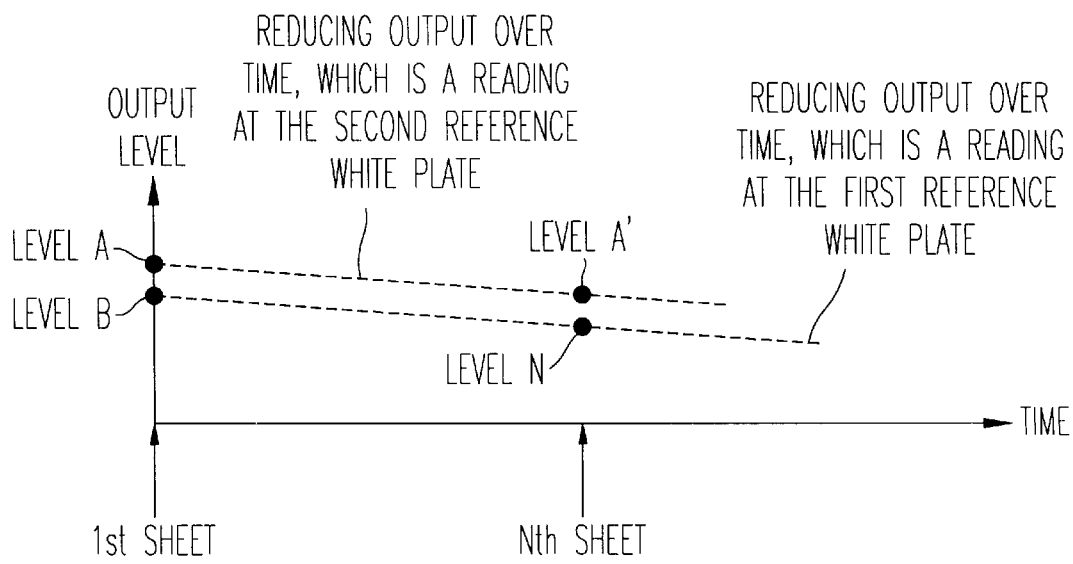
Figure 8A:
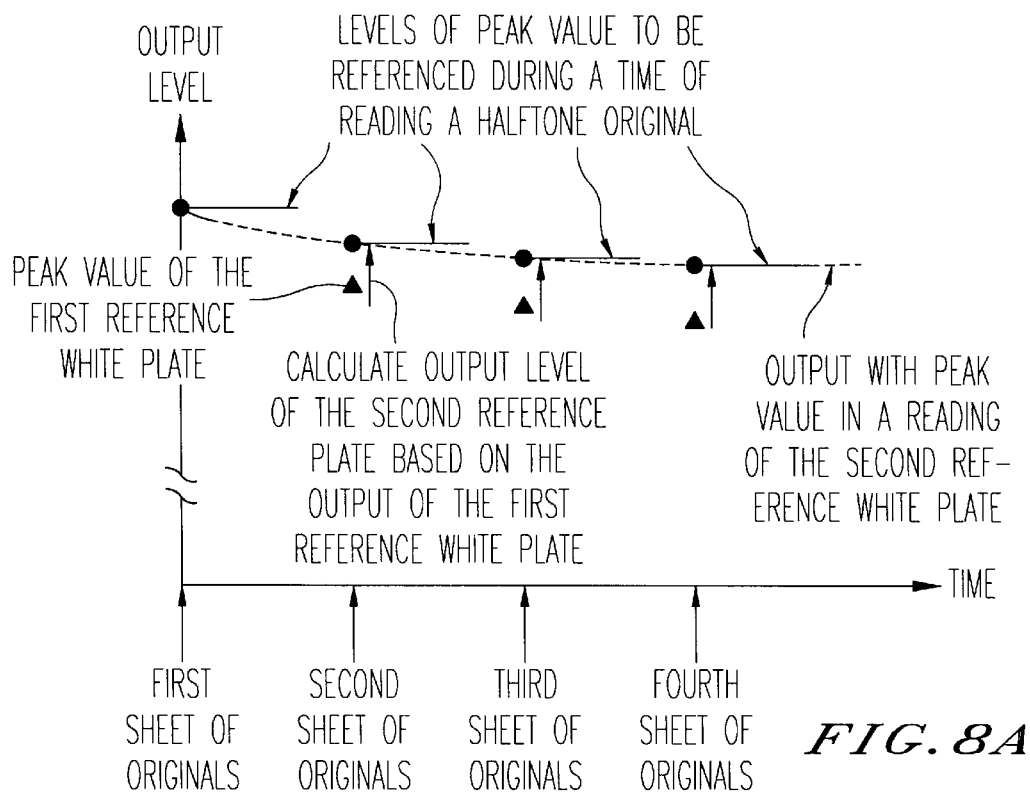
FIGS. 8(a) and 8(b) are illustrations explaining another example of a reference white plate reading timing in a case of having a difference in an output level by readings of two reference white plates.
Figure 8B:
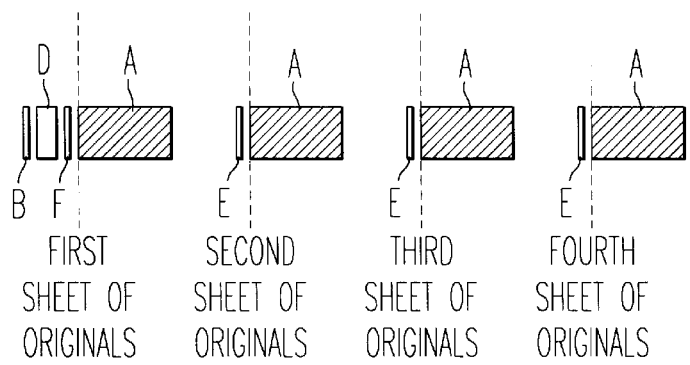

To address this situation, as a further novel feature of the present invention, the contact image sensor 21 may be arranged, as shown in FIGS. 7(b), FIGS. 8(a) and 8(b), to read the second reference white plate 20 to read in shading correction data and determine a peak value to be used for the stationary sheet through scanning mode.

In this further operation of the present invention, a correction factor between reading of the first reference white plate 14 and the second reference white plate 20 is calculated, and is utilized in the reading of an original document. In FIG. 8(b), the further letter or Step F indicates a time required for reading in a peak value from the first reference white 14 and a time for calculating a peak value correction factor by comparing an output from both the first reference white plate 14 and the second reference white plate 20.

As shown in FIGS. 7(b), 8(a) and 8(b), in this further operation of the present invention, a second reference white plate 20 is first read and a peak value based on this reading is determined (Level A) prior to reading a first sheet of an original document, as indicated by Step B in FIG. 8(b). After a completion of this data reading in, the contact image sensor 21 is moved to the reading position X1 for the stationary sheet through scanning mode under the first reference white plate 14, see Step D in FIG. 8(b). Then, the first reference white plate 14 is read and a peak value in a reading of the first reference white plate 14 (Level B) is compared with the peak value in the reading of the second reference white plate 20 (Level A), and then a correction factor of a peak value in a reading of the first reference white plate 14 is calculated, see Step F in FIG. 8(b), and is used for a second and succeeding sheets of the original document, based on the above-mentioned comparison of the two peak values.

This operation as shown in FIGS. 8(a) and 8(b) is also applicable in the above-mentioned case that two contact glasses which have different thicknesses are used in the stationary sheet through scanning system and in the moving book scanning system. In this case also, a correction is made on the peak value in a reading of the reference white plates 14, 20 by taking into account such a difference in thickness of the contact glasses, and such a correction is applied from a correction on the first sheet of the original document.

Figures 14A, 14B:
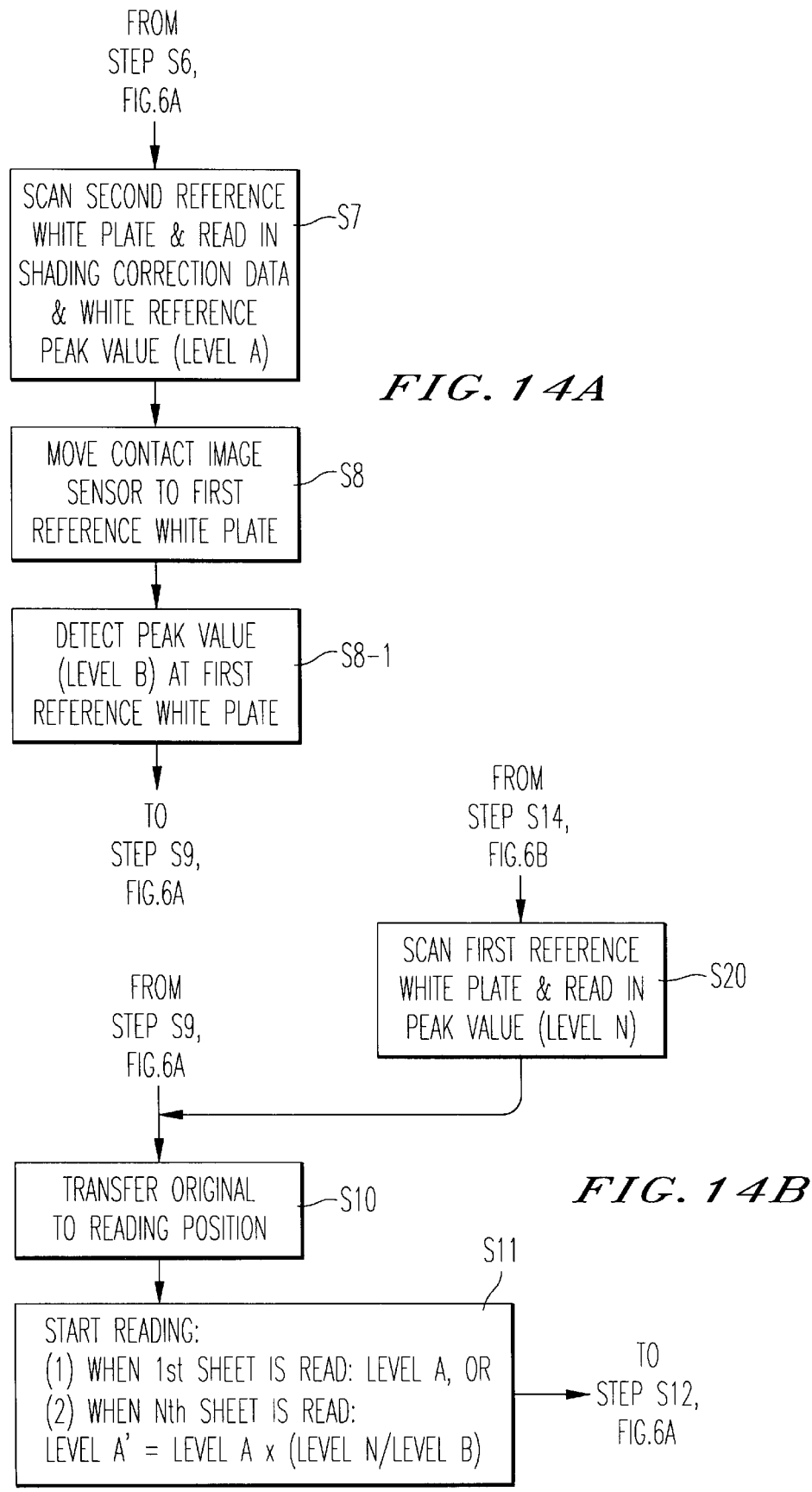
FIGS. 14(a) and 14(b) are flowcharts explaining a further reading process according to the present invention.

FIG. 14(a) and FIG. 14(b) show how the flowchart of FIG. 6 is modified to incorporate this operation of calculating a correction value as noted above.

As shown in FIG. 14(a), to include this correction operation of the present invention, after a light is activated in Step S6, the second reference white plate 20 is scanned and a reference white peak value based thereon is read in, and is designated as a Level A. The system then proceeds to Step S8 in which the contact image sensor 21 is moved to the standby position X1 to read the first reference white plate 14. Then, an additional Step S8-1 is executed in which the first reference white plate 14 is read and a white reference peak value based on this reading is detected, which is indicated as Level B. The system then proceeds again to Step S9 in which the second sensor 17 turning on indicates a sheet moving toward the first reading position X1.

As shown in FIG. 14(b), the system then proceeds to Step S10 where the original document is transferred to the reading position X1. Then, in this further embodiment of the present invention, a modified Step S11 is executed in which when a first sheet of the document to be read is at the reading position X1, the white reference peak value Level A from reading of the second reference white plate 20 is utilized. However, when second and subsequent sheets of the original document are being read, a correction Level A' is utilized based on a further reading of the first reference white plate 14 and a reading in of a peak level thereon as Level N in Step S20. This corrected Level A' is then based on the read peak value with the first reference white plate currently being read, Level N, divided by the initially detected peak value at the first reference white plate 14, Level B, multiplied by the initially read peak value Level A in reading the second reference white plate 20.

With this operation of the present invention, even if the first reference white plate 14 is at a different height relative to the image sensor 21 compared with that of the second reference white plate 20, the correction value can compensate for this difference. Further, in this operation of the present invention, if the first reference white plate 14 is read prior to each reading of the second and subsequent sheets of the multiple sheet original document, a decrease in an output of light as shown in FIG. 4 can also be compensated for.

Figure 9A:
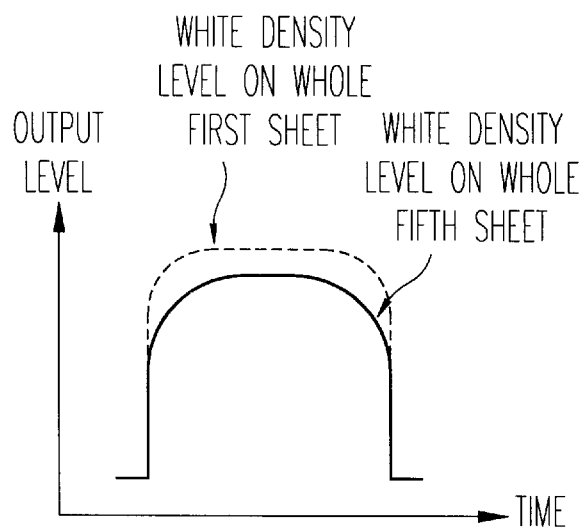
FIGS. 9(a) and 9(b) are illustrations of output signal waveforms from a contact image sensor explaining a signal level reduction at both edges of the light source of the contact image sensor.
Figure 9B:
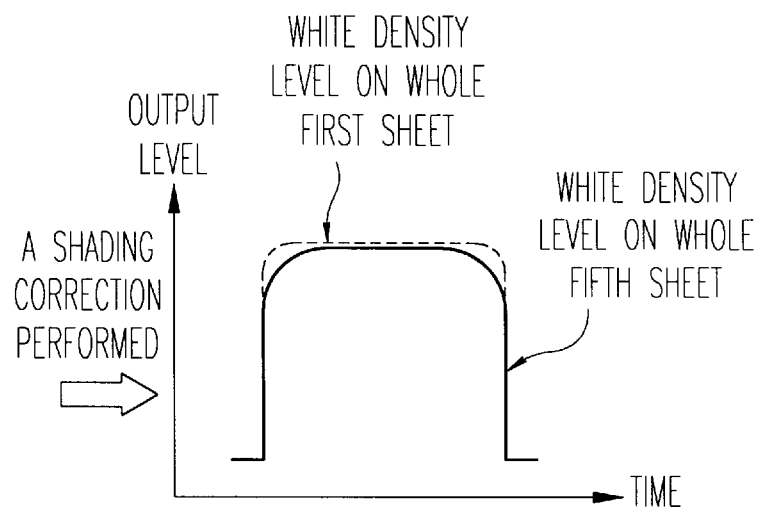

In the above-mentioned reading operations, it is not a significant problem when a white output level of all picture elements evenly varies relative to a peak value in a reading of the reference white plate. However, it may be a problem when the light source of the contact image sensor 21 has a bar shaped fluorescent-lamp like characteristic in which outputs towards both ends of the bar shaped fluorescent lamp degrade faster than an output around the middle part of the bar shaped fluorescent lamp, i.e., a florescent lamp may be brighter in its center than at its edges, as shown in FIG. 9(a). This is problematic because an output of contact image sensor 21 becomes as indicated in FIG. 9(b) if the shading correction applied at the beginning of the reading is kept continuously applied. As a result, an output is generated with a darkened image at the both sides of the sheet in accordance with the light source having a darkened power level at the both sides.

The above-mentioned problem may be avoided by repeating, as shown in FIG. 5(b), at each reading of a sheet of the original document, a movement of the contact image sensor 21 so as to read in the shading correction data based on the peak value in a reading of the second reference white plate 20; however, this operation consumes a large amount of time. In addition, if the contact image sensor 21 applies a light source whose turn-on time is slow, further time is needed when the light of the contact image sensor 21 is turned off to read in correction data for at output at a black level.

Figure 10A:
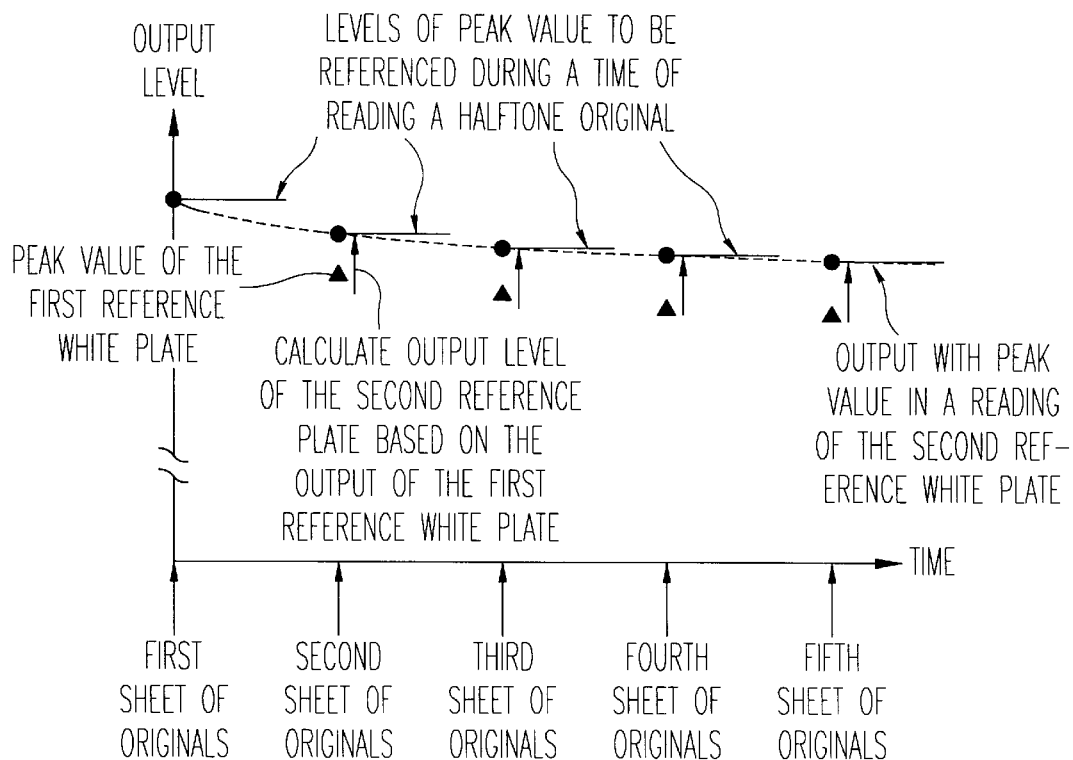
FIGS. 10(a) and 10(b) are illustrations explaining an example of a reference white plate reading timing in a case of having a signal level reduction at both edges of the light source of the contact image sensor.
Figure 10B:
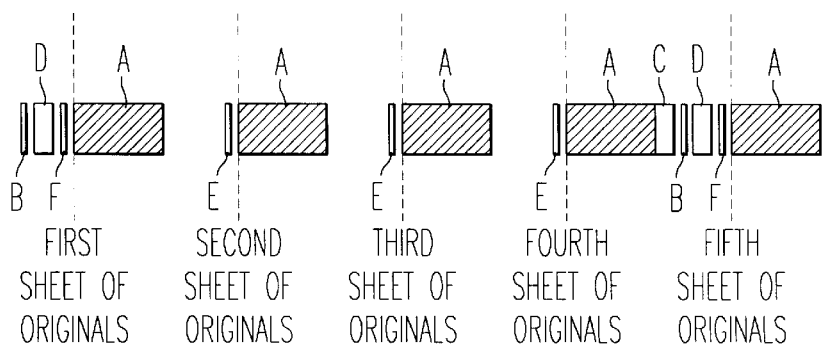
Figure 11A:
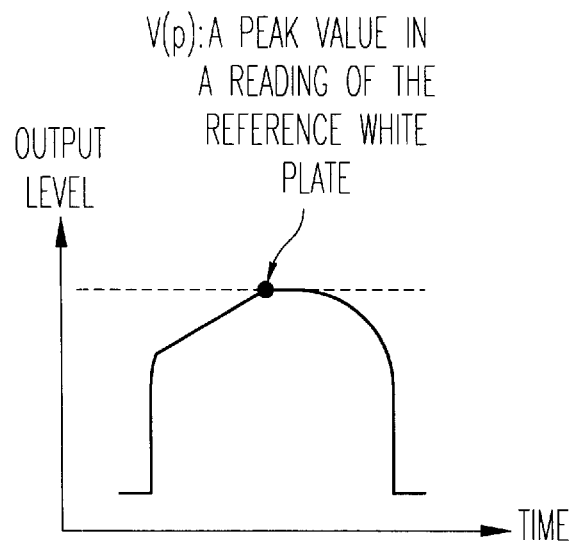
FIGS. 11(a) and 11(b) are illustrations of output signal waveforms from the contact image sensor explaining a shading correction in a background original document reading apparatus.
Figure 11B:
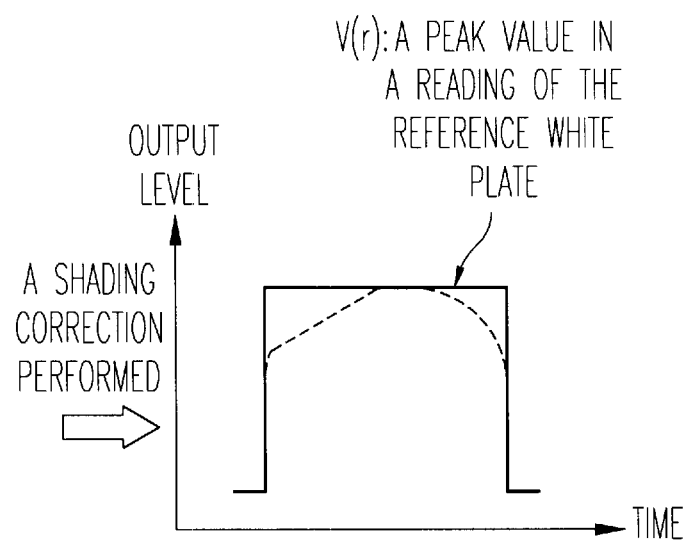
Figure 12A:
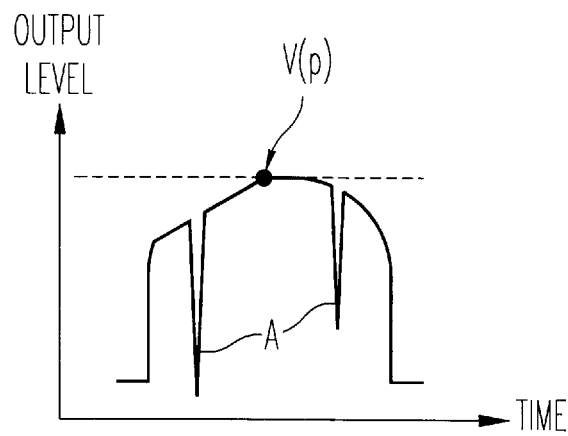
FIGS. 12(a) and 12(b) are illustrations of output signal waveforms from the contact image sensor explaining an abnormal shading correction in a background original document reading apparatus.
Figure 12B:
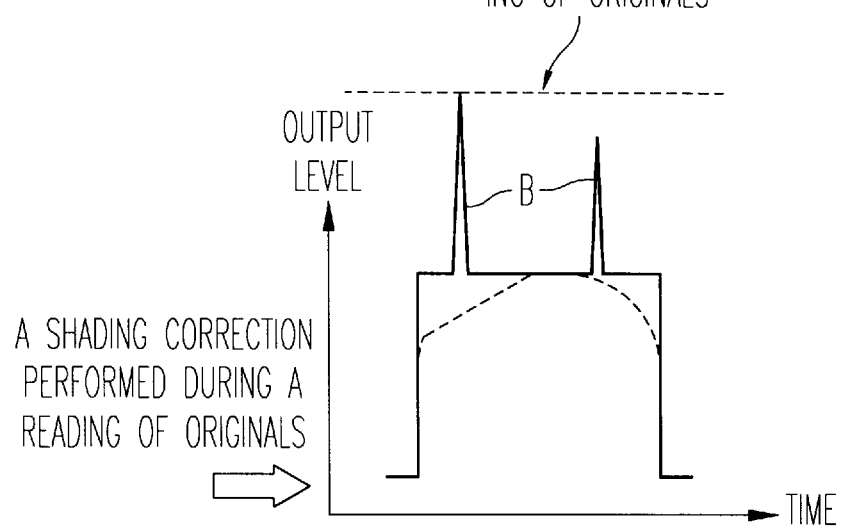
Figure 13:
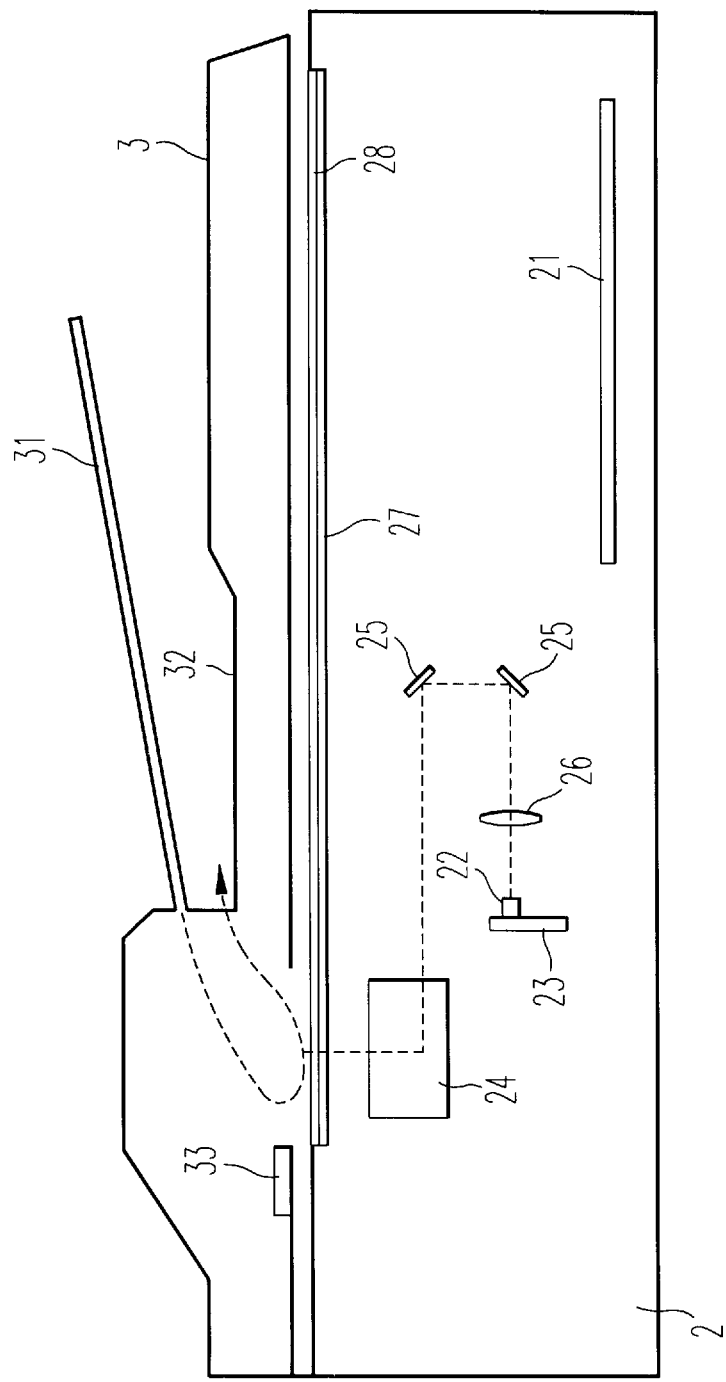
FIG. 13 is an illustration of a further background original document reading apparatus.

Accordingly, as a further novel feature of the present invention, when multiple sheets of an original document are consecutively transferred, as shown in FIGS. 10(a) and 10(b), the contact image sensor 21 is arranged, so that after reading a predetermined number of sheets of the original document, for example, after every 4 sheets of the original document in the embodiment shown in FIG. 10(b) are read, to move to the second reference white plate 20 and read the second reference white plate 20 to read in the shading correction data and a peak value to be used as the reference white data. Upon a completion of reading in the data, the contact image sensor 21 is arranged to move to the reading position X1 under the first reference white plate 14 and to read the first reference white plate 14 for the next four sheets of the original document.

Then, the peak value in a reading of the first reference white plate 14 is compared with the peak value in a reading of the second reference white plate 20, and a correction factor of a peak value in the reading of the first reference white plate 14 to be used for a second and succeeding sheets of the original document is calculated based on the above-mentioned comparison of the two peak values, as shown in FIG. 14 discussed above. This correction factor is then applied to a reading of the second and succeeding sheets of the original document thereafter in a cycle of a sheet reading, so as to shorten an operation time thereof.

The above-mentioned reading cycle for changing a correction factor for the multiple sheet original document in the consecutive reading mode may also be determined based on a predetermined time cycle.

Figure 15:
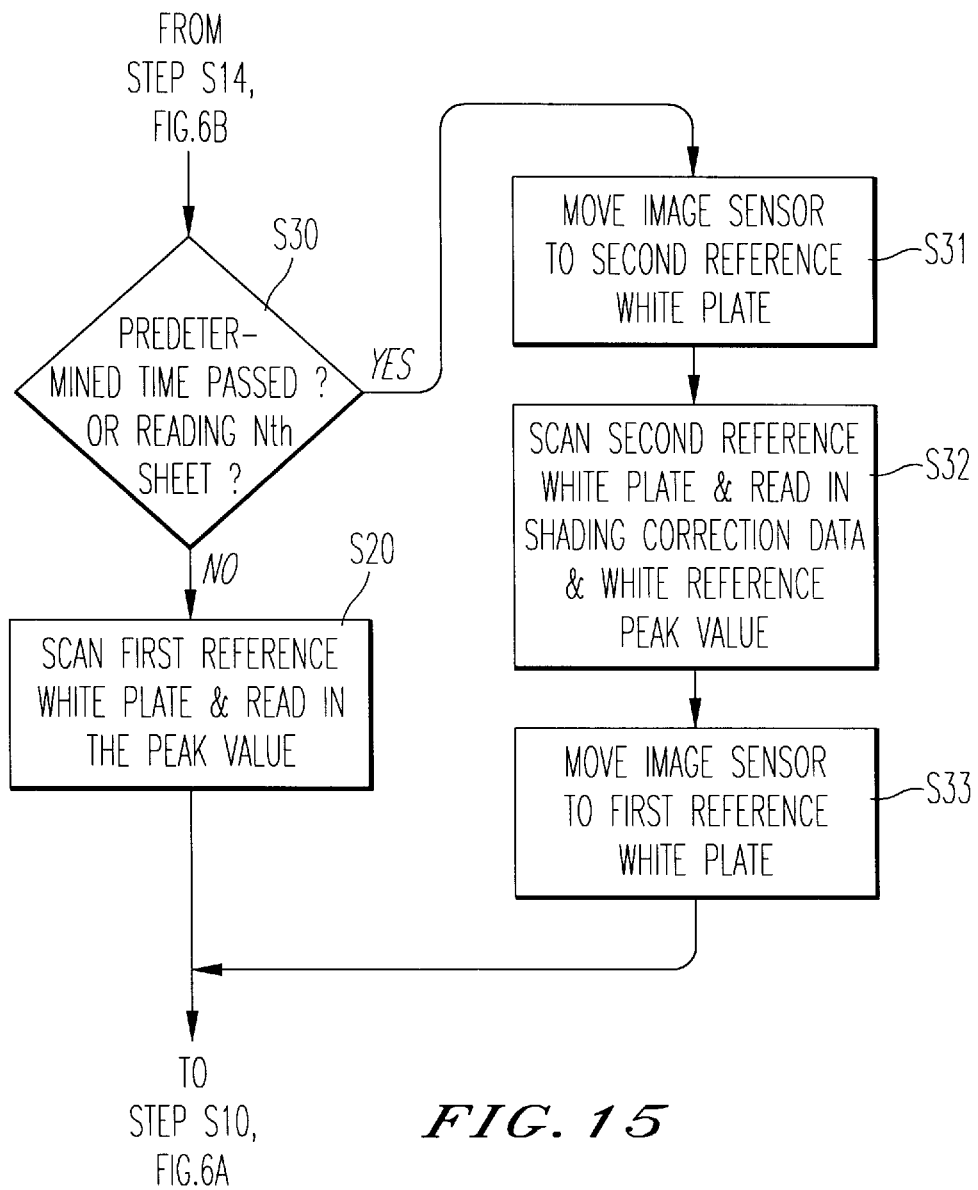
FIG. 15 is a flowchart explaining a further reading operation of the present invention.

This further operation of the present invention is shown in FIG. 15 which shows the modifications necessary to the flowchart of FIG. 6 to achieve such an operation of the present invention. As shown in FIG. 15, the system of the present invention proceeds from Step S14 to first determine whether a predetermined time has passed or whether the predetermined Nth sheet has been read. In the example shown in FIG. 10, after the fourth sheet has been read, a YES is indicated in Step S30. If NO in Step S30, the system proceeds to Step S20 to read the first reference white plate 14 and read in the peak value based therein. If YES in Step S30, the image sensor 21 is moved to the position X2 beneath the second reference white plate 20. Then, the second reference white plate 20 is scanned and the shading correction data and the white reference peak value data based on the scanning of the second reference white plate 20 are read in, see Step S32. Then, the system proceeds to Step S33 where the contact image sensor 21 is again moved to the position X1 underneath the first reference white plate 14.

In this operation of the present invention, after every predetermined number of sheets have been read, or after a predetermined period of time, the second reference white plate 20 is again read. As noted above, this operation of the present invention can also be combined with the operation shown in FIG. 14 to utilize the correction value operation.

Further, when the contact image sensor has a standby time before a start of each reading, such as a facsimile apparatus has in its image data transmission operation, a control of a reading operation as shown in FIG. 5(a) can be implemented such that Step C of moving the contact image sensor 21 to position X2 under the second reference white plate 20, Step B of reading in of the peak value data from reading the second reference white plate 20, and Step D of moving the contact image sensor back to reading position X1, can be arranged to be completed within the standby time, to thereby avoid giving a user an unpleasant feeling that the machine takes too long when reading.

The present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

Obviously, numerous additional modifications and variations of the present invention are possible in light of the above teachings. It is therefore to be understood that within the scope of the appended claims, the present invention may be practiced otherwise than as specifically described herein.

What is claimed as new and is desired to be secured by Letters Patent of the United States is:

1. A reading device including a contact glass on which an original document of at least one sheet is placed, and a transferring mechanism for transferring the original document, comprising:

reading means for reading the original document in one of a stationary reading mode in which said reading means reads the original document by moving said original document placed on said contact glass relative to said reading means, and a moving reading mode in which said reading means reads the original document by moving relative to said original document which is stationary;

first reference white means for representing a first reference white density to be read by said reading means before a start of reading the original document, said first reference white means being located within an area through which said original document moves;

second reference white means for representing a second reference white density to be read by said reading means before a start of reading the original document, said second reference white means being located outside of an area through which said original document moves; and controlling means for controlling said reading means to read said white density of said second reference white means in said stationary reading mode.

2. The reading device according to claim 1, wherein said controlling means controls said reading means to move to read said white density of said second reference white means at each completion of reading a sheet of the original document, in said stationary reading mode.

3. The reading device according to claim 1, wherein said controlling means controls said reading means to move to read said white density of said second reference white means when said reading means is on a standby until a start of reading a succeeding sheet of the original document, in said stationary reading mode.

4. The reading device according to claim 3, wherein said controlling means controls said reading means to read said white density of said second reference white means in said stationary reading mode.

5. The reading device according to claim 1, wherein said controlling means controls said reading means to move to read said white density of said first reference white means when a first sheet of the original document is read, and to read said white density of said second reference white means when a second and succeeding sheets of the original document are read, in said stationary reading mode.

6. The reading device according to claim 5, wherein said controlling means inhibits reading in shading correction data when said reading means reads said white density of the second reference white means when one of the second and succeeding sheets of the original document are read.

7. The reading device according to claim 5, wherein said controlling means performs a correction on a white density value output by said reading means, when said controlling means detects a difference between a first distance from said reading means to the first reference white means and a second distance from said reading means to the second reference white means, said correction being in accordance with a value of said difference in distances.

8. The reading device according to claim 1, wherein said controlling means controls said reading means to move to read said white density of said second reference white means each time after a completion of reading a predetermined number of sheets of the original document.

9. The reading device according to claim 8, wherein said controlling means controls said reading means to move to read said white density of said second reference white means when said reading means is on standby until a start of reading a succeeding sheet of the original document, in said stationary reading mode.

10. The reading device according to claim 8, wherein said controlling means controls said reading means to read said white density of said second reference white means in said stationary reading mode.

11. The reading device according to claim 1, wherein said controlling means controls said reading means to read said white density of said second reference white means in said stationary reading mode.

12. A reading device including a contact glass on which an original document of at least one sheet is placed, and a transferring mechanism for transferring the original document, comprising:

a reader reading the original document in one of a stationary reading mode in which said reader reads the original document by moving said original document placed on said contact glass relative to said reader, and a moving reading mode in which said reader reads the original document by moving relative to said original document which is stationary;

a first reference white plate representing a first reference white density to be read by said reader before a start of reading the original document, said first reference white plate being located within an area through which said original document moves;

a second reference white plate for representing a second reference white density to be read by said reader before a start of reading the original document, said second reference white plate being located outside of an area through which said original document moves; and a controller controlling said reader to read said white density of said second reference white plate in said moving stationary mode.

13. The reading device according to claim 12, wherein said controller controls said reader to move to read said white density of said second reference white plate at each completion of reading a sheet of the original document, in said stationary reading mode.

14. The reading device according to claim 12, wherein said controller controls said reader to move to read said white density of said second reference white plate when said reader is on a standby until a start of reading a succeeding sheet of the original document, in said stationary reading mode.

15. The reading device according to claim 14, wherein said controller controls said reader to read said white density of said second reference white plate in said stationary reading mode.

16. The reading device according to claim 12, wherein said controller controls said reader to move to read said white density of said first reference white plate when a first sheet of the original document is read, and to read said white density of said second reference white plate when a second and succeeding sheets of the original document are read, in said stationary reading mode.

17. The reading device according to claim 16, wherein said controller inhibits reading in shading correction data when said reader reads said white density of the second reference white plate when one of the second and succeeding sheets of the original document are read.

18. The reading device according to claim 16, wherein said controller performs a correction on a white density value output by said reader, when said controller detects a difference between a first distance from said reader to the first reference white plate and a second distance from said reader to the second reference white plate, said correction being in accordance with a value of said difference in distances.

19. The reading device according to claim 12, wherein said controller controls said reader to move to read said white density of said second reference white plate each time after a completion of reading a predetermined number of sheets of the original document.

20. The reading device according to claim 19, wherein said controller controls said reader to move to read said white density of said second reference white plate when said reader is on a standby until a start of reading a succeeding sheet of the original document, in said stationary reading mode.

21. The reading device according to claim 19, wherein said controller controls said reader to read said white density of said second reference white plate in said stationary reading mode.

22. The reading device according to claim 12, wherein said controller controls said reader to read said white density of said second reference white plate in said stationary reading mode.

* * * * *